United States Patent [19]
Yamada et al.

[11] Patent Number: 5,985,229
[45] Date of Patent: Nov. 16, 1999

[54] SOLID SILICA DERIVATIVE AND PROCESS FOR PRODUCING THE SAME

[75] Inventors: Yoshinori Yamada, Aichi-ken; Katsuyoshi Harada, Okazaki, both of Japan

[73] Assignee: Toagosei Co., Ltd., Tokyo, Japan

[21] Appl. No.: 08/710,419

[22] Filed: Sep. 17, 1996

[30] Foreign Application Priority Data

Sep. 21, 1995 [JP] Japan ................................. 7-267800
Dec. 27, 1995 [JP] Japan ................................. 7-352026
Jan. 24, 1996 [JP] Japan ................................. 8-029918

[51] Int. Cl.$^6$ .......................... C01B 15/14; C01B 33/12; C04B 14/04
[52] U.S. Cl. .......................... 423/325; 423/335; 106/490
[58] Field of Search ................. 423/335, 338, 423/325; 106/490

[56] References Cited

U.S. PATENT DOCUMENTS

| | | | |
|---|---|---|---|
| 2,832,794 | 10/1958 | Gordon | 260/448.2 |
| 2,844,435 | 7/1958 | Wagner | 423/325 |
| 2,901,460 | 8/1959 | Boldebuck. | |
| 3,615,272 | 10/1971 | Collins | 423/325 |
| 4,016,188 | 4/1977 | Kötzsch et al. | 423/325 |
| 4,999,397 | 3/1991 | Weiss et al. | 524/755 |
| 5,010,159 | 4/1991 | Bank et al. | 528/23 |
| 5,063,267 | 11/1991 | Hanneman et al. | 524/284 |
| 5,091,162 | 2/1992 | Frye et al. | 423/325 |
| 5,106,604 | 4/1992 | Agaskar | 423/325 |

FOREIGN PATENT DOCUMENTS

| | | | |
|---|---|---|---|
| 225785 | 6/1987 | European Pat. Off. | 423/325 |
| 245648 | 5/1987 | Germany | 423/325 |
| 56-145111 | 11/1981 | Japan. | |
| 62-52119 | 3/1987 | Japan. | |

*Primary Examiner*—Gary P. Straub
*Attorney, Agent, or Firm*—Browdy and Neimark

[57] ABSTRACT

A solid silica derivative which is represented by the general formula $H_nSiO_{(4-n)/2}$ wherein n is a real number larger than 0 but smaller than 2 and which contains Si—H bond, said solid silica derivative being able to be easily produced in a high yield by subjecting to hydrolysis-condensation an alkoxysilane represented by the mean general formula $H_n$—$Si(OR^o)_{4-n}$ in which $R^o$ represents an alkyl group having 1 to 4 carbon atoms, plural $R^o$ groups may be the same as or different from one another and n is a real number greater than 0 but smaller than 2, using water in an amount of $(4-n)/2$ moles or more per mole of the alkoxysilane at a pH of 10.5 or less.

9 Claims, 3 Drawing Sheets

SOLID SILICA DERIVATIVE AND PROCESS FOR PRODUCING THE SAME

BACKGROUND OF THE INVENTION

This invention relates to a silica in which a part of silicon is chemically bonded to hydrogen, and more particularly, to a novel finely divided silica derivative which has a Si—H bond utilizable in chemically useful reactions such as reduction reaction, hydrosilylation reaction and the like and which is in the solid form that is convenient in industrial use, particularly the spherical form and has a uniform particle size distribution, and to a process for producing the same.

Solid, amorphous silicon dioxide represented by the general formula $SiO_2$ and generically named silica is used in a large amount as silica glass, or a moisture absorbent (silica gel), also as a catalyst carrier or the like because it is chemically inactive and resistant to high temperatures, and further as a filler for silicone rubber or the like. In particular, fine particles thereof are widely used in industry as a filler for rubber called white carbon, a thickening agent for liquid, or an anti-caking agent for powders, and further as a spacer for liquid crystal display though it is a special example, or the like.

Among them, in such uses as filler for rubber and the like, there is used inexpensive, finely divided silica which is produced by a method which comprises neutralizing sodium silicate with an acid such as sulfuric acid or the like, and in uses requiring a high quality, there is used finely divided silica having a uniform particle size distribution obtained by a method which comprises hydrolyzing tetraethoxysilane with a mixture of water and ammonia using an alcohol as a reaction solvent, as disclosed in, for example, JP-A-62-52119.

However, as stated above, most of the prior art methods of utilizing silica have been physical applications such as a catalyst carrier, a moisture absorbent, a filler for resin and the like, which applications utilize solely physical characteristics of silica such as viscosity, strength and hardness.

It has not been deeply studied to impart chemical characteristics to silica per se and utilize the same; however, there has been made such a device as to apply various chemical modifications to the silica surface depending upon the purposes. There have been proposed such methods as a method which comprises adding a compound having a double bond to the OH group present on the silica surface to make the silica excellent in compatibility with a resin, a method which comprises incorporating a finely divided silicon hydride represented by the general formula $SiH_x$ into a coating agent to impart a rust-preventiveness to the coating agent because the silicon hydride has an excellent rust-preventing effect based on the reducibility of hydrogen (JP-A-56-145,111), and the like.

Silicon hydride is an effective means for allowing silica per se to have chemical characteristics and using the same. However, silicon hydride must be prepared by using a monosilane gas or its chloride, which is expensive and, in addition, instable and difficult to handle as the starting material and subjecting the same to gaseous phase pyrolysis reaction. Therefore, the silicon hydride is high in production cost and, in addition, chemically instable and high in combustibility and hence difficult to handle. Thus, it is unsuitable for general utilization.

Silica is generally produced by a method comprising subjecting to hydrolysis-condensation a hydrolyzable silane such as a tetraalkoxysilane; an alkylalkoxysilane obtained by alkylating a part of the alkoxy groups of the tetraalkoxysilane; or the like. However, the hydrolysis-condensation reaction of these hydrolyzable silanes is slow, and hence, severe reaction conditions using a basic catalyst must be adopted for producing silica. Therefore, it is very difficult to obtain silica having a reactive group such as Si—H, which is easily converted to an inactive hydroxyl group as a side reaction.

SUMMARY OF THE INVENTION

Under the above-mentioned circumstances, the present inventors have made extensive research to solve the above-mentioned problems by not chemically modifying the surface of silica but allowing silica per se to have a reactive Si—H bond, and have consequently found that a novel solid silica derivative having a Si—H bond represented by the general formula $H_nSiO_{(4-n)/2}$ in which n is a real number larger than 0 but smaller than 2 (said silica derivative is referred to hereinafter as the hydrogen-containing silica derivative) can be produced by subjecting to hydrolysis-condensation with water an alkoxysilane represented by the mean general formula $H_n-Si(OR^0)_{4-n}$ in which $R^0$ represents an alkyl group having 1 to 4 carbon atoms and plural $R^0$ groups may be the same as or different from one another and n is a real number greater than 0 but smaller than 2, under the specific conditions.

An object of this invention is to utilize the characteristics of silica that silica can be produced at a low cost and is chemically stable.

Another object of this invention is to make it possible to chemically bond a functional group utilizable for a chemical reaction such as reduction reaction, hydrosilylation reaction or the like to the surface of silica.

A still another object of this invention is to provide a solid, particularly, finely divided silica derivative having, in addition to the above characteristics, rust-preventive properties similar to those of silicon hydride.

A further object of this invention is to provide a process for producing the above solid, particularly finely divided, silica derivative.

Other objects and advantages of this invention will become apparent from the following description.

According to this invention, there is provided a solid silica derivative which is represented by the general formula $H_nSiO_{(4-n)/2}$ wherein n is a real number greater than 0 but smaller than 2 and which contains a Si—H bond.

According to this invention, there is further provided a process for producing the above solid silica derivative, which comprises subjecting to hydrolysis-condensation an alkoxysilane represented by the mean general formula $H_n—Si(OR^0)_{4-n}$ wherein $R^0$ represents an alkyl group having 1 to 4 carbon atoms, plural $R^0$ groups may be the same as or different from one another and n is a real number greater than 0 but smaller than 2, using water in an amount of $(4-n)/2$ moles or more per mole of the alkoxysilane at a pH of 10.5 or less.

DETAILED DESCRIPTION OF THE INVENTION

Figure 1:
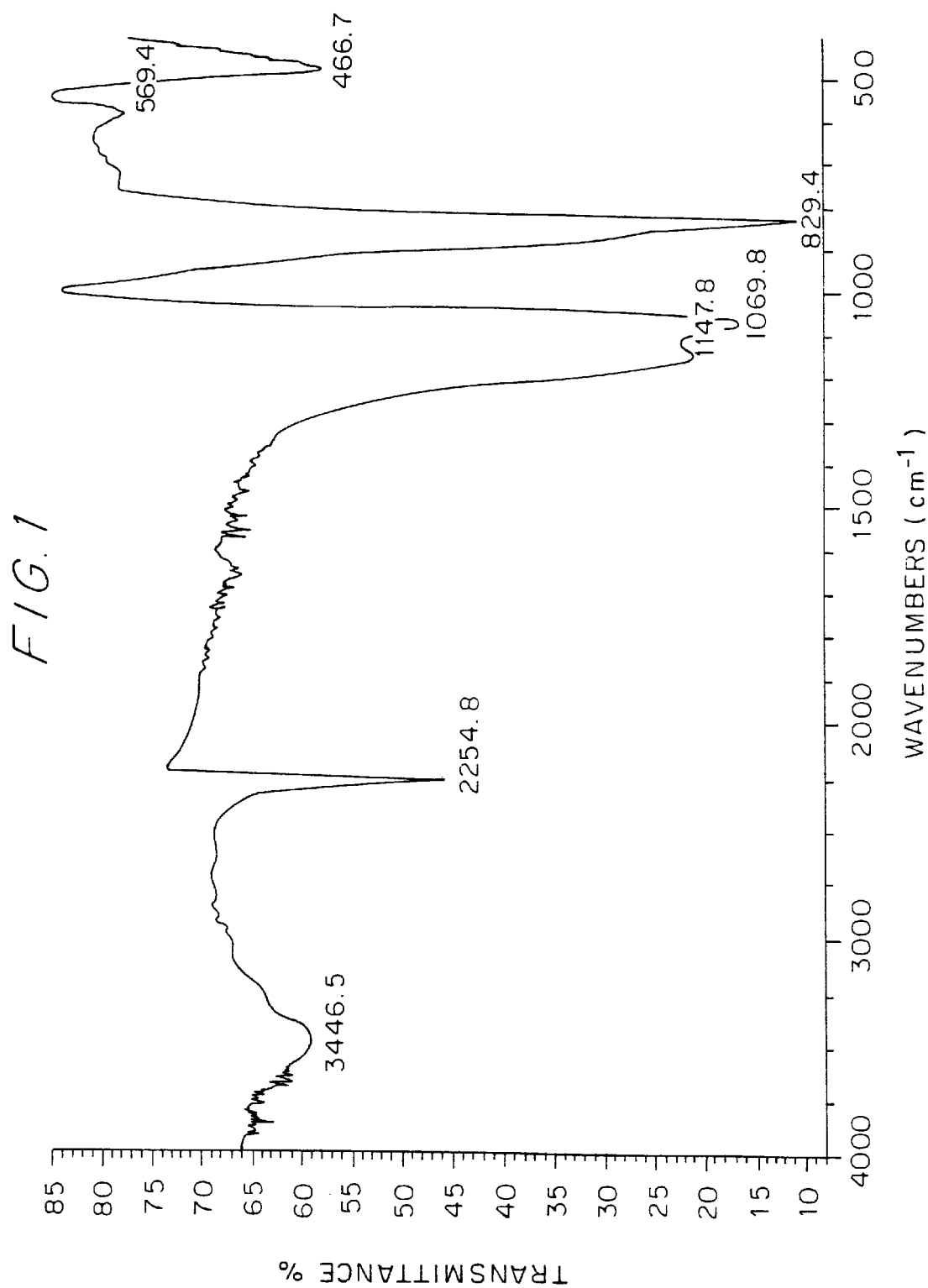
FIG. 1 is an infrared absorption spectrum pattern of a white powder (hydrogen-containing silica derivative powder) obtained in Example 1 appearing hereinafter.

In the starting alkoxysilane represented by the mean general formula $H_n$—$Si(OR^O)_{4-n}$ used in this invention, $R^O$ is an alkyl group having 1 to 4 carbon atoms and includes specifically methyl, ethyl, propyl, isopropyl, n-butyl, i-butyl and t-butyl.

Plural $R^O$ groups of the alkoxysilane may be the same as or different from one another, and a mixture of the alkoxysilanes having diverse $R^O$ groups may also be used.

The smaller the number of carbon atoms of $R^O$, the more easily the hydrolysis reaction takes place and the faster the hydrolysis and condensation reactions proceed. Therefore, $R^O$ is preferably methyl or ethyl. With any $R^O$, $R^OOH$ (alcohol) produced as a by-product accompanying the hydrolysis reaction can be easily separated and recovered by such a method as distillation or the like and can be re-utilized. For this purpose, the plural $R^O$ groups are preferably of the same kind because the separation of the alcohol produced becomes unnecessary and hence the process becomes economical.

In this invention, it is preferable to use only trialkoxysilanes represented by the formula H—$Si(OR)_3$ wherein R represents an alkyl group having 1 to 4 carbon atoms and plural R groups may be the same as or different from one another as the starting material. However, it is possible to co-use a dialkoxysilane or tetraalkoxysilane represented by the general formula $H_m$—$Si(OR')_{4-m}$ in which R' is an alkyl group having 1 to 4 carbon atoms, plural R' groups may be the same as or different from one another, and m is 0 or 2, or a mixture thereof.

However, the dialkoxysilanes are poor in stability and expensive, and hence, the use thereof in a large amount is uneconomical. The tetraalkoxysilane is low in reactivity, and hence, when it is used in a large amount together with the trialkoxysilane, there is a fear that the tetraalkoxysilane may remain unreacted. Therefore, it is preferable that the amount of the dialkoxysilane and tetraalkoxysilane mixed is adjusted to less than 50% by weight based on the total weight of the alkoxysilanes used as the starting materials.

R' of the tetraalkoxysilane and dialkoxysilane is specifically selected from the group consisting of methyl, ethyl, propyl, isopropyl, n-butyl, i-butyl and t-butyl. Plural R' groups may be the same as or different from one another, and a mixture of alkoxysilanes having diverse R' groups can be used.

The smaller the number of carbon atoms of R', the more easily the hydrolysis reaction takes place and the faster the hydrolysis and condensation reactions proceed. Therefore, R' is preferably methyl or ethyl. With any R', R'OH (alcohol) produced as a by-product accompanying the hydrolysis reaction can easily be separated and recovered by such a method as distillation or the like and can be re-utilized. For this purpose, however, it is preferable that the plural R' groups are of the same kind because the separation of the alcohol produced becomes unnecessary and hence the process becomes economical. Moreover, for the same reason, when a trialkoxysilane is used together with a tetraalkoxysilane or dialkoxysilane, it is preferable that R and R' are the same.

The hydrolysis-condensation of the alkoxysilane represented by the mean general formula $H_n$—$Si(OR^O)_{4-n}$ is effected by placing the alkoxysilane in a suitable vessel and add thereto water in an amount of $(4-n)/2$ moles or more per mole of the alkoxysilane with thorough stirring.

Accordingly, it follows that when one mole of a trialkoxysilane (n=1) is subjected to hydrolysis-condensation, 3/2 moles or more of water is used per mole of the trialkoxysilane.

When the trialkoxysilane is used together with the tetraalkoxysilane and/or the dialkoxysilane and subjected to hydrolysis-condensation, the minimum amount of water added can be determined by substituting for n of the formula $(4-n)/2$ the real number of n in the mean general formula $H_n$—$Si(OR^O)_{4-n}$ calculated based on the proportions of the constituting alkoxysilanes.

In the hydrolysis of an alkoxysilane, the use of water in an amount smaller than $(4-n)/2$ moles brings about the result that unreacted alkoxy groups remain, and hence, when the hydrogen-containing silica derivative produced is used in the presence of water, there is a fear that there may be caused such problems that an alcohol is produced and the thermal stability of the hydrogen-containing silica derivative becomes inferior. On the contrary, when water is added too excessively, much labor is required for drying the resulting gel and when the alcohol produced as a by-product is recovered, there is a fear that the purity of the alcohol may be lowered. The amount of water is preferably $(4-n)/2$ moles to $(4-n)$ moles, more preferably $(4-n)/2$ moles to $0.65(4-n)$ moles, per mole of the alkoxysilane, provided that in order to directly obtain finely divided silica derivative without through such a step as pulverization and the like, it is preferable to increase the amount of water, that is, water is used in an amount of $2.5(4-n)$ to $50(4-n)$ moles, preferably $5(4-n)$ to $30(4-n)$ moles, per mole of the alkoxysilane.

In the general formula $H_nSiO_{(4-n)/2}$ for the hydrogen-containing silica derivative obtained by hydrolysis, n can be varied depending upon the amounts of dialkoxysilane and tetraalkoxysilane used among the starting alkoxysilanes. That is to say, when only trialkoxysilane is used as the starting material, the theoretical composition of the hydrogen-containing silica derivative obtained becomes $HSiO_{3/2}$.

When a dialkoxysilane is added to the starting trialkoxysilane, n becomes larger, and when a tetraalkoxysilane is added, n becomes smaller. A larger n value is preferred because the amount of hydrogen contained in the hydrogen-containing silica derivative obtained is increased as the n value is increased; however, the dialkoxysilane is chemically instable as compared with the trialkoxysilane, and hence, it is not desirable to increase the n value too much in the aspect of easy handling and cost of the starting material. Therefore, the preferable range of n is $0<n\leq1.3$, and the more preferable range of n is $0.7\leq n\leq1.0$.

As explained hereinafter, when the pH value of water used in the hydrolysis-condensation is high and the reaction temperature is high, the Si—H bond is decreased and n becomes small.

When the water used in the hydrolysis-condensation is strongly alkaline, Si—H is converted to Si—OH while hydrogen is generated, so that it is necessary that the water be weakly alkaline to acidic corresponding to a pH of 10.5 or less, and water having a pH of not less than 5.5 but not more than 10.5 is preferable and water having a pH of not less than 6.5 to not more than 10.5 is particularly preferable.

When such conditions are used that the Si—H bond tends to become instable, for example, when the hydrolysis reaction temperature is set high, it is preferable to lower the pH. However, when the acidity is too strong, there is a fear that such a problem that corrosion of a reactor takes place may be caused.

Moreover, when the alkoxysilane is hydrolyzed under a strongly acidic atmosphere, the Si—H bond remains stable, but the hydrolysis reaction mixture becomes gel-like as a whole and when the gel-like reaction mixture is dried as it is the mixture becomes a bulky, glass-like solid. When this bulky solid is pulverized or the gel is dried while a stirring force is applied to the gel, a finely divided, Si—H bond-containing silica derivative which is visually powdery can be obtained; however, the silica derivative obtained has an indeterminate form and the particle sizes are not uniform, so that when it is used in admixture with a resin or solvent, there is such a problem that precipitates are easily formed.

In particular, particles which are spherical and uniform in particle size, exhibit good fluidity when mixed with other materials such as resin, paint and the like and used as a filler or a viscosity modifier, and the mixture is hardly aggregated when stored for a long period of time. The particles furthermore have such characteristics that when they are used as a pigment, the light reflection characteristics are constant, so that they hold an important position in many industrial uses. However, when the particles are too fine, they tend to aggregate with one another, while when they are coarse, the surface area of particles which can be used in chemical reactions becomes small, so that the preferable particle size of the hydrogen-containing silica derivative ranges from 0.05 $\mu$m to 1 $\mu$m. The pH value of the reaction system is determined considering the above point.

In the hydrolysis-condensation of the alkoxysilane, water is used at a pH value of 10.5 or less; however, it is not necessary that the water used have the same pH value throughout the reaction. For example, such a method is preferably used that at the beginning of the hydrolysis-condensation, water having a relatively high pH value is added to accelerate the production of fine particles, and in the latter half, water having a relatively low pH value is added to more stabilize the Si—H group and prevent the Si—H group from being diminished in the subsequent separation and drying steps.

For adjusting the pH of water used in the hydrolysis-condensation to 10.5 or less, it is sufficient to dissolve in the water a common, acidic substance such as acetic acid, hydrochloric acid, sulfuric acid, carbonic acid, paratoluenesulfonic acid or the like or a common, alkaline substance such as potassium hydroxide, sodium hydroxide, calcium hydroxide, ammonia, ethylamine or the like. However, since the alkoxysilanes have a reducibility, the use of a strongly oxidative substance such as nitric acid, bichromic acid or the like is not desirable. When a volatile acid such as acetic acid, hydrochloric acid, carbonic acid or the like is used as the acidic substance, the acid component remaining in the hydrogen-containing silica derivative can be volatilized off in the drying step. On the contrary, when a nonvolatile acid such as sulfuric acid, paratoluenesulfonic acid or the like is used, the incorporation of the acid into the recovered alcohol can be prevented. However, carbon dioxide gas is particularly preferable as the acidic substance because it is neither oxidative nor corrosive and can be easily volatilized off after the production of fine particles. When the carbon dioxide gas is used, acidic water having a pH suitable to this invention can easily be obtained by controlling the partial pressure of the carbon dioxide gas in the atmosphere in which the water to be used in hydrolysis is placed.

Ammonia is a preferable alkaline substance for the same reasons as above. Alkaline water having a desired pH can be easily obtained by diluting, for example, commercially available 25% ammonia water. As the method of measuring a pH, there can be used a common means such as a pH meter using a glass electrode, more simply a pH test paper or the like.

It is preferable to use a reaction solvent in the hydrolysis-condensation, and the reaction solvent is preferably a solvent in which both alkoxysilane and water used in the hydrolysis can be dissolved in the pH range at the time of reaction. Preferred are alcohols such as methanol, ethanol, isopropanol, butanol, ethylene glycol, propylene glycol and the like. When an alcohol composed of the same group as the alkoxy group of the alkoxysilane is used as the reaction solvent, the reaction solvent and the alcohol produced as a by-product by the hydrolysis-condensation of the alkoxysilane can be simultaneously recovered and regenerated after completion of the reaction, so that the alcohol is more preferable as the reaction solvent.

When the amount of the reaction solvent used is too small, the resulting particles agglomerate before the particles are sufficiently condensed and hardened, and there is a fear that the particles may be hardened in the form of an agglomerate whose particle sizes are not uniform. On the other hand, when the reaction solvent is used too excessively, the cost becomes high. Therefore, the amount of the reaction solvent is preferably 3 to 30 times, more preferably 5 to 20 times, the volume of the alkoxysilane.

The process for the hydrolysis-condensation of the alkoxysilane includes various methods such as a method which comprises dissolving the alkoxysilane in the reaction solvent and dropping water thereinto with stirring, a method which comprises dissolving water in the reaction solvent and dropping the alkoxysilane thereinto with stirring, a method which comprises dissolving the water or alkoxysilane to be dropped in the reaction solvent and then dropping the resulting solution in the above two methods, or the like. By any of these methods, a finely divided Si—H bond-containing silica derivative can be obtained.

Among them, it is preferable to previously place in a reactor a reaction solvent, a liquid mixture of water and the reaction solvent or a solution of the alkoxysilane in the reaction solvent, and gradually add thereto a liquid mixture of the remainder of water and the reaction solvent, and a solution of the remainder of the alkoxysilane in the reaction solvent, specifically simultaneously drop them, to mix them because in this case, the fluctuation of concentrations of the unreacted alkoxysilane and water in the reactor is small and hence particles having very uniform particle sizes are produced.

Since the hydrolysis of the alkoxysilane is an exothermic reaction, the temperature of the reaction mixture rises with progress of the reaction. When the temperature becomes too high, a partial condensation proceeds and the alcohol produced as a by-product reacts with the Si—H of the alkoxysilane to generate hydrogen. Therefore, the reaction temperature is preferably in the range of from 0° C. to 50° C., more preferably in the range of from 0° C. to 30° C. The reaction temperature affects greatly the particle size distribution of the fine particles obtained, so that the particle size distribution of the fine particles obtained can be controlled by controlling the reaction temperature.

The specific reaction time is greatly varied depending upon the shape of a reactor, the stirring manner and the like, and hence, it is difficult to limit the reaction time. However, in general, with a batchwise reactor, the reaction for too short a period of time causes a difficulty because the heat of reaction must be removed, while the reaction for too long a period of time is not economical. Therefore, usually, it is preferable that almost all the starting materials are mixed over 10 minutes to 10 hours, more preferably over 30 minutes to 5 hours to react them gradually and uniformly.

However, these conditions are not applied to a continuous reaction system, and the residence time in the mixer may be very short as far as the rate of feeding the stating materials and the reaction time are sufficiently controlled. In any case, when the starting materials are hastily added to the re action mixture, heat is suddenly generated in only a part of the reaction mixture, and gelation proceeds. Therefore, the starting materials had better be added gradually and uniformly.

Even after completion of the mixing, it is preferable to continue the stirring of the reaction mixture for a while in order to complete the condensation reaction in the fine particles produced. However, immediately after completion of the mixing, it is possible to take out the fine particles, or alternatively, a continuous reaction in which mixing and separation are simultaneously conducted is also possible. The stirring speed also affects the particle size distribution of fine particles; however, in such a practical stirring speed range that the reaction mixture is uniformly mixed, there is no problem in obtaining a finely divided Si—H bond-containing silica derivative.

The finely divided Si—H bond-containing silica derivative produced in the reaction mixture by the hydrolysis of the alkoxysilane can be separated from the reaction mixture by a common, industrial solid-liquid separation method such as centrifugal separation, filtration, distillation or the like. The primary particles of the separated fine particles have usually particle sizes of 0.1 $\mu$m to 100 $\mu$m; however, under some reaction conditions, the primary particles having said particle sizes agglomerate to form larger secondary particles having particle sizes of several millimeters or more in some cases. The resulting agglomerates, however, can be easily disintegrated to primary particles by a usual pulverizing method such as ultrasonic wave dispersion, ball milling, vibration milling, refrigeration pulverization or the like. The reaction mixture from which the fine particles have been separated and removed can be regenerated by a method such as filtration, distillation or the like, adjusted to a suitable pH value and then used again.

For drying, there can be used a general method such as natural drying, hot air drying, kiln drying or the like; however, an economical and preferable method comprises effecting the drying in, for example, a closed system such as a rotary evaporator, liquefying and recovering the alcohol vapor generated and re-utilizing the alcohol produced as a by-product.

In the case of a heat-drying, at too high a temperature, there is a fear that the Si—H bond of the hydrogen-containing silica derivative may split, so that the drying temperature is preferably 320° C. or less, more preferably 0° C. to 250° C.

When a transparent gel containing the alcohol produced as a by-product is formed, this gel can be dried to obtain a solid, hydrogen-containing silica derivative.

The gel produced by the hydrolysis-condensation causes slightly hardening and shrinking as the alcohol contained therein escapes away by drying, and lastly a transparent, block-like to particle-like solid is formed. When the reaction mixture before completion of gelation is allowed to stand in a mold, a hydrogen-containing silica derivative having the same shape as the mold can be obtained. When the reaction mixture is allowed to stand in the form of a film, a hydrogen-containing silica derivative is obtained in the form of a film, and when a paper or fiber cloth is impregnated with the reaction mixture and allowed to stand as it is, an impregnated paper or fiber cloth can be obtained. Also, when the reaction mixture is applied to the surface of a substrate and hardened, a coating film of a hydrogen-containing silica derivative can be obtained. These hydrogen-containing silica derivatives can be pulverized to a powder by a usual pulverizer such as a vibration pulverizer, a ball mill, a refrigeration pulverizer or the like.

The hydrogen-containing silica derivative of this invention is solid, normally non-crystalline and different from a low molecular weight monomer or polymer. The amount of the Si—H contained in the hydrogen-containing silica derivative obtained can be quantitatively determined by, for example, a CHN-element analyzing method. In the CHN-element analyzing method, the analysis of C is simultaneously conducted, so that it can be confirmed that the hydrogen-containing silica derivative does not contain any organic substance. Moreover, said amount can be determined by a method such as an oxidation-reduction titration method utilizing the reduction reaction of Si—H, for example, a direct titration method using an aqueous potassium permanganate solution or the like.

The particle size distribution of the finely divided Si—H bond-containing silica derivative thus obtained can be measured by dispersing the particles in a suitable solvent and then subjecting the resulting dispersion to a particle size distribution measuring apparatus of a laser diffraction system, a settling system or the like. Furthermore, that the Si—H bond is chemically contained can be confirmed from the fact that in the infrared absorption spectrum measurement, an infrared absorption appears at the wavelength characteristic of Si—H bond. In order to quantify the Si—H bond, a CHN-element analyzing method can also be used in addition to an alkali decomposition titration method and an oxidation-reduction titration method.

In the hydrogen-containing silica derivative of this invention, the silica per se has a reactive Si—H bond, and hence, the silica derivative can be utilized in chemical reactions such as reduction reaction, hydrosilylation reaction and the like and hence is chemically useful. In particular, the finely divided silica derivative having a sphere shape and having a uniform particle size distribution is industrially useful. According to the production process of this invention, the above-mentioned useful hydrogen-containing silica derivative can be easily produced in a high yield by subjecting the specific alkoxysilane to hydrolysis-condensation under the specific conditions.

DESCRIPTION OF THE PREFERRED EMBODIMENTS

Examples and Comparative Examples are shown below to explain the Si—H bond-containing solid silica derivative and its production process of this invention in more detail.

EXAMPLE 1

In a 500-ml, three-necked glass flask was placed 164 g of triethoxysilane, and 28 g of distilled water was dropped thereinto with stirring at room temperature over about one hour. Thereafter, stirring was continued while the flask was ice-cooled, about one hour after which the whole reaction mixture was converted to a transparent, soft gel. This reaction mixture gel was placed in a flask for rotary evaporator and the flask was mounted in a rotary evaporator and warmed in a water bath at 80° C. with rotating, and the contents of the flask were subjected to distillation under a reduced pressure of 200 Torr. After about two hours, 53 g of a white powder remained in the flask. The liquefied ethanol was collected in an amount of 139 g in a receiver.

The result of infrared absorption spectrum analysis of the white powder obtained is shown in FIG. 1. In addition to the absorption due to the Si—O—Si bond at 1100 cm$^{-1}$, an absorption due to the Si—H linkage at 2250 cm$^{-1}$ appears largely, and no absorption of organic group appears, so that it is confirmed that a hydrogen-containing silica derivative represented by the general formula $H_nSiO_{(4-n)/2}$ was produced.

The content of each of the C, H and N elements contained in the hydrogen-containing silica derivative was measured by a CHN-element analyzing apparatus (Model MT-5 of Yanagimoto Seisakusho) to obtain such results that C=0%, H=1.90% and N=0%. From the results, it was confirmed that a hydrogen-containing silica derivative of $HSiO_{3/2}$ which corresponds to the general formula $H_nSiO_{(4-n)/2}$ in which n is 1.0, was obtained.

Figure 2:
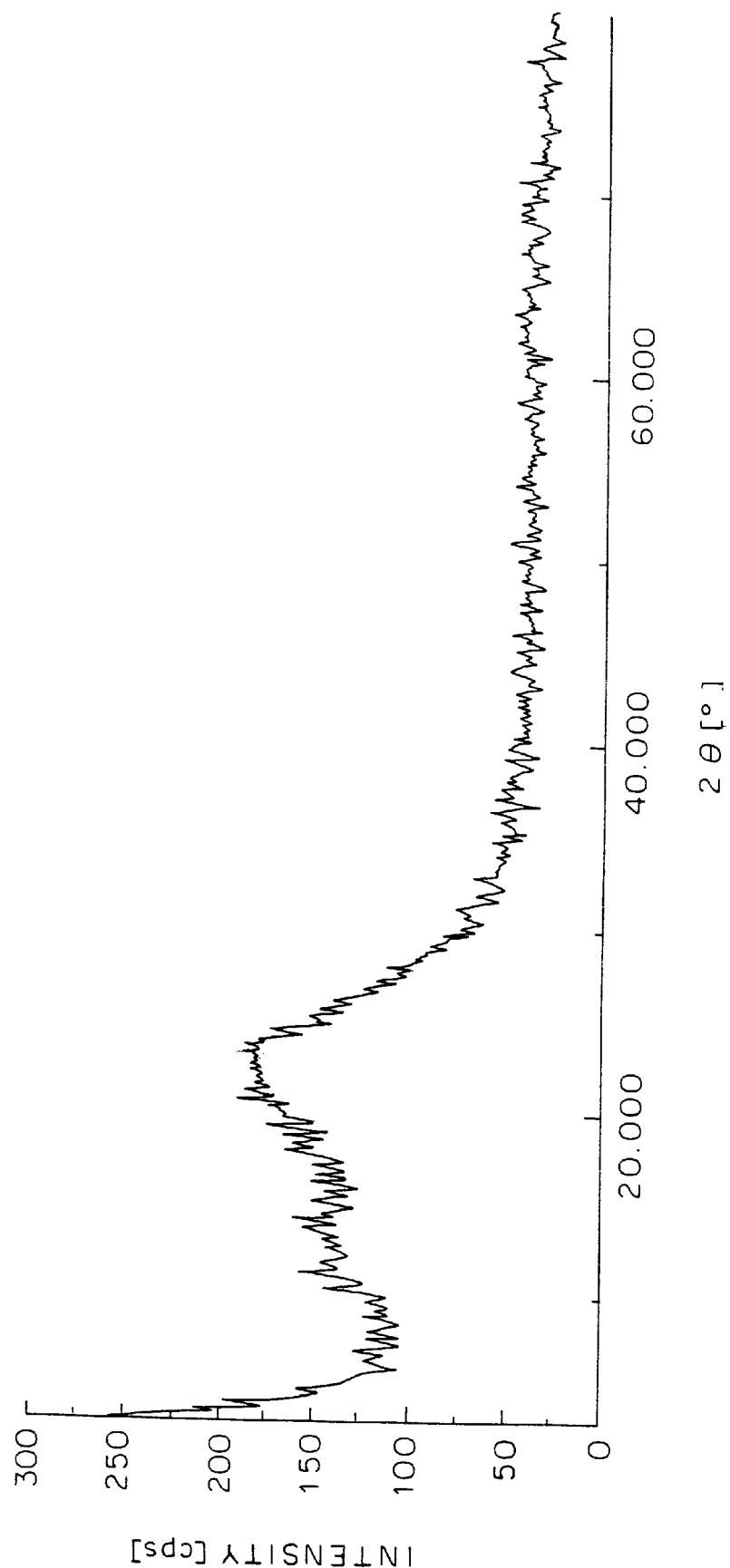
FIG. 2 is an X-ray diffraction spectrum pattern of the same white powder as in FIG. 1.

Moreover, this hydrogen-containing silica derivative powder was well ground down in an agate mortar and thereafter packed in a sample holder of a powder X-ray diffractometer (Model RINT2400V manufactured by Rigaku Denki Kabushiki Kaisha) and subjected to measurement of powder X-ray diffraction spectrum. The results obtained are shown in FIG. 2. No clear diffraction peak was found in the spectrum measured, so that this sample was found to be amorphous.

EXAMPLE 2

In a 500-ml, three-necked glass flask were placed 132 g of triethoxysilane and 41.6 g of tetraethoxysilane, and 30 g of distilled water was dropped thereinto in the same manner as in Example 1 to obtain 54.4 g of a white powder and recover 148.4 g of ethanol. The results of the infrared absorption spectrum analysis of this white powder showed that an absorption at 2250 cm$^{-1}$ due to the Si—H bond appeared largely as in Example 1. The results of a CHN-element analysis were such that C=0%, H=1.47% and N=0%, and from the results, it was confirmed that a hydrogen-containing silica derivative of $H_{4/5}SiO_{8/5}$ which corresponds to the general formula $H_nSiO_{(4-n)/2}$ in which n is 0.8, was obtained.

The hydrogen-containing silica derivative powder obtained was pulverized in a ball mill for 8 hours to form fine powder having an average particle size of 0.5 μm or less, and thereafter, 0.1 g of the powder was placed in an Erlenmeyer flask and directly subjected to oxidation-reduction titration using a 1/10 N standard solution of potassium permanganate acidified with sulfuric acid, upon which it was observed that the color of permanganate ion disappeared and the titer was 14.2 ml. From this, the amount of Si—H was determined to be 1.42 moles per 100 g of the hydrogen-containing silica derivative and n in the formula $H_nSiO_{(4-n)/2}$ was calculated as about 0.78, which was substantially consistent with the result of the CHN-element analysis.

EXAMPLE 3

In a 500-ml, three-necked glass flask were placed 147.6 g of triethoxysilane and 12 g of diethoxysilane, and 30 g of distilled water was dropped thereinto in the same manner as in Example 1 to obtain 52.3 g of a white powder and recover 137.3 g of ethanol. The results of the infrared absorption spectrum analysis of this white powder showed that an absorption due to the Si—H bond at 2250 cm$^{-1}$ appeared largely as in Example 1. The results of the CHN element analysis were such that C=0%, H=2.10% and N=0%, and hence, it was confirmed from the results that a hydrogen-containing silica derivative of $H_{11/10}SiO_{29/20}$ which corresponds to the general formula $H_nSiO_{(4-n)/2}$ in which n is 1.1, was obtained.

EXAMPLE 4

Reaction was conducted under the same conditions as in Example 1, except that the hydrolyzing liquid was changed from distilled water to 0.01% aqueous paratoluenesulfonic acid solution. The pH of this aqueous solution was 4.

As a result, 53 g of a white powder was obtained and 139 g of ethanol was recovered.

The results of infrared absorption spectrum analysis of the white powder were consistent with FIG. 1, and the results of the CHN-element analysis were also completely consistent with those in Example 1. Therefore, similarly to Example 1, it was confirmed that a hydrogen-containing silica derivative of $HSiO_{3/2}$ was obtained.

EXAMPLE 5

In a 500-ml, three necked glass flask was placed 164 g of triethoxysilane, and 28 g of distilled water was dropped thereinto with stirring over about one hour. After 30 minutes from the completion of the dropping, the reaction mixture became a transparent, viscous liquid. This liquid was coated on a slide glass by means of a No. 28 bar coater. Thereafter, this slide glass was dried at 100° C. for 8 hours, upon which a colorless, transparent film having a thickness of about 1 μm was formed. A part of this film was peeled and subjected to infrared absorption spectrum analysis to find that the absorption curve was consistent with that in Example 1. Therefore, it was confirmed that the same hydrogen-containing silica derivative as in Example 1 was produced.

EXAMPLE 6

Into 122 g of trimethoxysilane was dropped 28 g of distilled water in the same manner as in Example 1, to obtain 53 g of a white powder and recover 97 g of methanol. The results of the infrared absorption spectrum analysis of this white powder were consistent with those in Example 1, so that it was confirmed that the same hydrogen-containing silica derivative as in Example 1 was produced.

EXAMPLE 7

Reaction was conducted under the same conditions as in Example 1, except that the hydrolyzing liquid was changed from distilled water to 0.01% ammonia water. The pH of this solution was 10.5. As a result, 53 g of a white powder was obtained.

The results of the infrared absorption spectrum analysis of the white powder were consistent with FIG. 1 and the results of a CHN-element analysis were also completely consistent with those in Example 1, so that it was confirmed that a hydrogen-containing silica derivative of $HSiO_{3/2}$ was obtained as in Example 1.

EXAMPLE 8

Reaction was conducted under the same conditions as in Example 1, except that the hydrolyzing solution was changed from distilled water to 0.001% diluted hydrochloric acid. The pH of the diluted hydrochloric acid was 3.6. As a result, 53 g of a white powder was obtained.

The results of the infrared absorption spectrum analysis of the white powder were consistent with FIG. 1 and the results of the CHN-element analysis were also completely consistent with those in Example 1. Therefore, it was confirmed that a hydrogen-containing silica derivative of HSiO$_{3/2}$ was obtained as in Example 1.

COMPARATIVE EXAMPLE 1

In the same manner as in Example 1, 28 g of 0.1% ammonia water was dropped into 164 g of triethoxysilane to obtain 60 g of a white powder and recover 132 g of ethanol.

Figure 3:
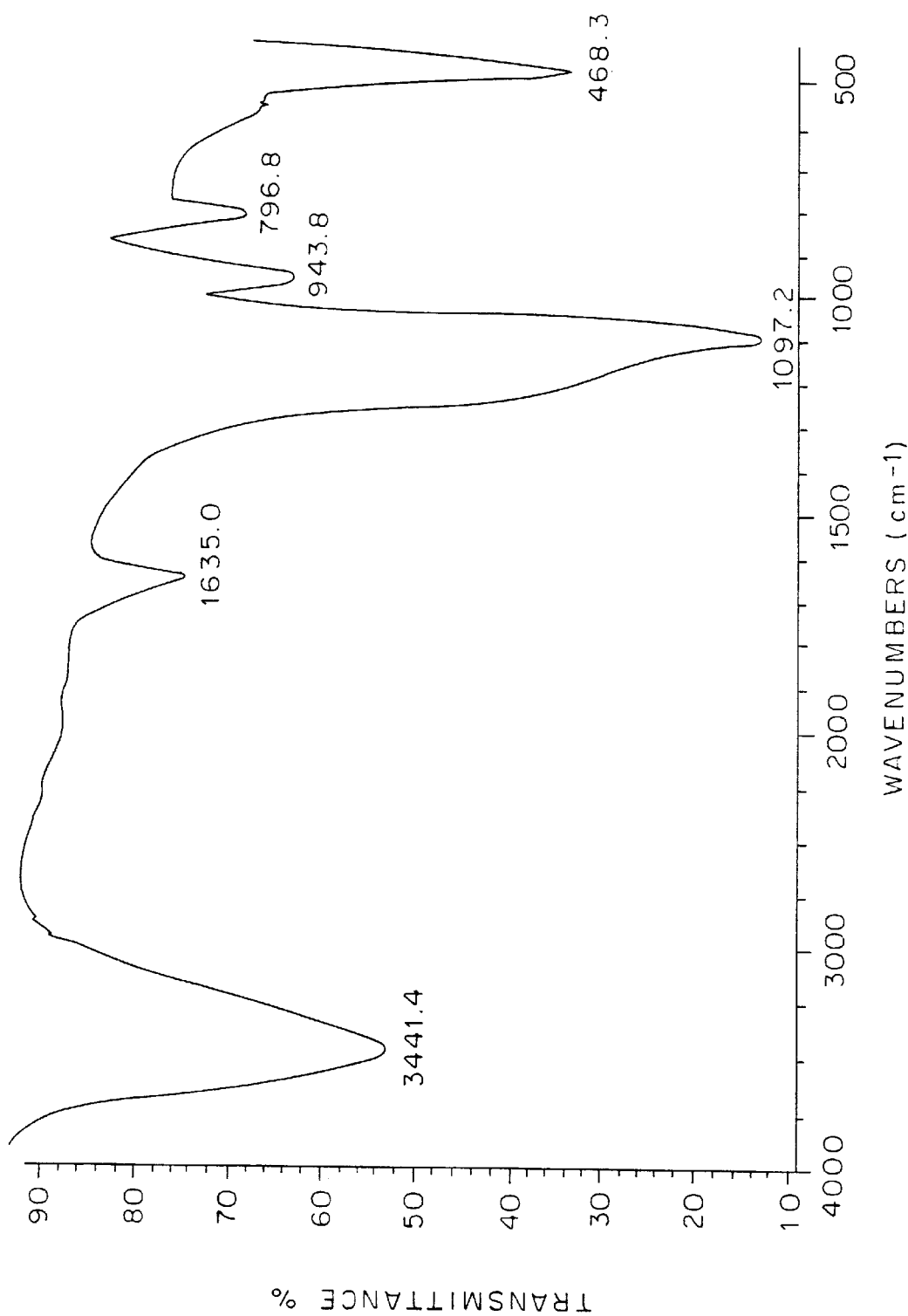
FIG. 3 is an infrared absorption spectrum pattern of a white powder obtained in Comparative Example 1 appearing hereinafter.

The pH of the 0.1% ammonia water was 11.0. The results of the infrared absorption spectrum analysis of this substance were as shown in FIG. 3. The absorption due to the Si—O—Si bond at 1100 cm$^{-1}$ was identical with that in Example 1, but no absorption due to the Si—H bond was found at 2250 cm$^{-1}$. It was confirmed therefrom that no Si—H bond was present and silica represented by the general formula SiO$_2$ was produced. Also, the results of the CHN-element analysis were such that C=0%, H=0% and N=0%. From this fact, it was confirmed that no Si—H bond was present.

COMPARATIVE EXAMPLE 2

Reaction was conducted in the same manner as in Example 1, except that 9 g (0.5 mole) of distilled water which was less than 1.5 moles per mole (164 g) of triethoxysilane was dropped. Even when the stirring was continued for 12 hours, the reaction mixture was left as it was transparent and liquid, and no gel was formed.

EXAMPLE 9

In a 1-liter, three-necked, separable flask made of glass were placed 84 g of ethanol and 48 g of 0.001% by weight ammonia water. The pH of the 0.001% by weight ammonia water was measured to find that it was 9.7. This liquid mixture was stirred by a mechanical stirrer at 300 rpm and the reactor was kept at room temperature. Separately, a liquid mixture of 320 g of ethanol and 360 g of 0.01% by weight ammonia water was prepared as liquid A and a solution of 320 g of ethanol and 200 g of triethoxysilane was prepared as liquid B. The pH of the 0.01% by weight ammonia water was measured to find that it was 10.3. The liquid A and the liquid B were dropped at a rate of 8 g/min and at a rate of 4 g/min, respectively, into the liquid mixture in the flask. Five minutes after the beginning of the dropping, the reaction mixture began opalization. After completion of the dropping of the liquid A, the dropping of the liquid B was continued as it was. After completion of the dropping of the liquid B, the stirring was further continued for 3 hours to complete the reaction. Fine particles were produced in the reaction mixture, and the diameters of the fine particles were measured by a particle size distribution measuring apparatus of a laser diffraction system to find that the average particle diameter was 1.3 μm.

After completion of the reaction, the reaction mixture was subjected to distillation under a reduced pressure of 60 mmHg at 50° C. in a rotary evaporator to remove the solvent, about 3 hours after which a dry white powder was obtained. This powder was observed through an electron microscope to find that the particles had spherical shapes having approximately uniform particle diameters of 0.4 μm and only some of the particles were found to form secondary particles by agglomeration of several primary particles. The results of infrared absorption spectrum measurement were substantially consistent with FIG. 1 and hence it was confirmed that a Si—H bond-containing silica derivative represented by the general formula H$_n$SiO$_{(4-n)/2}$ was obtained. The results of measurement by a CHN-element analyzing apparatus were such that C=0%, H=1.9% and N=0%. Therefore, it was confirmed that a finely divided Si—H bond-containing silica derivative represented by the formula HSiO$_{3/2}$ was obtained. The weight of the finely divided Si—H bond-containing silica derivative thus obtained was 63.1 g and the yield as HSiO$_{3/2}$ was calculated as 97.6% from the starting triethoxysilane.

COMPARATIVE EXAMPLE 3

In a 1-liter, three-necked, separable flask made of glass were placed 84 g of ethanol and 48 g of 0.1% by weight ammonia water and stirred by a mechanical stirrer at 300 rpm. The pH of the 0.1% by weight ammonia water was measured to find that it was 11.8. The reactor was kept at room temperature. Separately, a liquid mixture of 320 g of ethanol and 360 g of 0.1% by weight ammonia water and a solution of 320 g of ethanol and 200 g of triethoxysilane were prepared as liquid A and liquid B. The liquid A and the liquid B were dropped at a rate of 8 g/min and at a rate of 4 g/min, respectively, into the liquid mixture in the flask. Immediately after the beginning of the dropping, the reaction mixture began opalization. After completion of the dropping of the liquid A, the dropping of the liquid B was continued as it was. After completion of the dropping of the liquid B, the stirring was further continued for 3 hours to complete the reaction.

After completion of the reaction, the solvent was removed in the same manner as in Example 9 to obtain a white powder. This powder was observed through an electron microscope to find that the powder had a shape formed by agglomeration of many spherical, fine particles having diameters of about 0.2 μm. By an infrared absorption spectrum measurement, it was confirmed that since substantially no absorption due to the Si—H bond appeared at 2250$^{-1}$, the Si—H bond was lost. The results of measurement by a CHN-element analyzing apparatus were such that C=0%, H=0% and N=0%. This showed that the fine particles obtained were silica represented by the general formula SiO$_2$. The weight of the fine particles thus obtained was 71.7 g and the yield as SiO$_2$ was calculated as 98.0%.

EXAMPLE 10

In a 1-liter, three-necked, separable flask made of glass were placed 84 g of ethanol and 48 g of 0.001% by weight diluted hydrochloric acid. The pH of the 0.001% by weight diluted hydrochloric acid was 3.6. This liquid mixture was stirred by a mechanical stirrer at 300 rpm and the reactor was kept at room temperature. Separately, a liquid mixture of 320 g of ethanol and 360 g of distilled water was prepared as liquid A and a solution of 320 g of ethanol and 200 g of triethoxysilane was prepared as liquid B. The liquid A and the liquid B were dropped at a rate of 8 g/min and at a rate of 4 g/min, respectively, into the liquid mixture in the flask. Even after the dropping of both liquids had been completed, the reaction mixture did not cause opalization. When the stirring of the reaction mixture was further continued for about one hour, the whole reaction mixture gelled. Therefore, the reaction was terminated.

After completion of the reaction, the reaction mixture gel was taken out and placed in the flask of a rotary evaporator and the solvent was removed in the same manner as in Example 9, upon which the production of a dry, white powder was confirmed visually. This powder was observed through an electron microscope to find that the particles were those having indeterminate shapes and various sizes such as needle shapes or block shapes having long diameters of several μm to several mm.

The results of infrared absorption spectrum measurement of these particles were substantially consistent with FIG. 1 and in addition to absorption due to the Si—O—Si bond at 1100$^{-1}$, an absorption due to the Si—H bond appeared largely at 2250 cm$^{-1}$, and no absorption of organic group appeared. Therefore, it was confirmed that a Si—H bond-containing silica derivative represented by the general formula H$_n$SiO$_{(4-n)/2}$ was produced. The results of measurement by a CHN-element analyzing apparatus were such that C=0%, H=1.9% and N=0%. Therefore, it was confirmed that the product was a Si—H bond-containing silica derivative represented by the formula HSiO$_{3/2}$. The weight of the Si—H bond-containing silica derivative thus obtained was 63.3 g and the yield was 98%.

EXAMPLE 11

In a 1-liter, three-necked, separable flask made of glass were placed 84 g of isopropanol and 48 g of distilled water and the liquid mixture was stirred by a mechanical stirrer at 300 rpm. The reactor was kept at room temperature. Separately, a liquid mixture of 320 g of isopropanol and 360 g of 0.01% by weight ammonia water was prepared as liquid A and a solution of 320 g of isopropanol and 200 g of triethoxysilane was prepared as liquid B. The liquid A and the liquid B were dropped at a rate of 8 g/min and at a rate of 4 g/min, respectively, into the liquid mixture in the separable flask. Five minutes after the beginning of dropping, the reaction mixture began opalization. After completion of the dropping of the liquid A, the dropping of the liquid B was continued as it was. After completion of the dropping of the liquid B, the stirring of the reaction mixture was further continued for 3 hours to complete the reaction. The diameters of the fine particles in the reaction mixture after completion of the reaction were measured by a particle size distribution measuring apparatus of the laser diffraction system to find that the average particle diameter was 0.7 μm.

After completion of the reaction, the reaction mixture was subjected to a centrifuge to remove the supernatant liquid, placed in a vacuum dryer and vacuum-dried under reduced pressure at 60° C. for 4 hours, upon which a dry, white powder was obtained. This powder was observed through an electron microscope to find that the particles were in the form of a sphere having a substantially uniform diameter of 0.6 μm. Only some of particles were found to form secondary particles by agglomeration of several fine particles. The results of infrared absorption spectrum measurement were substantially consistent with FIG. 1 and in addition to absorption due to the Si—O—Si bond at 1100 cm$^{-1}$, an absorption due to the Si—H bond appeared largely at 2250 cm$^{-1}$, and no absorption of organic group appeared. Therefore, it was confirmed that a Si—H bond-containing silica derivative represented by the general formula H$_n$SiO$_{(4-n)/2}$ was produced. The results of measurement by a CHN-element analyzing apparatus were such that C=0%, H=1.9% and N=0%. Therefore, it was confirmed that the product was a finely divided Si—H bond-containing silica derivative represented by the formula HSiO$_{3/2}$. The weight of the finely divided Si—H bond-containing silica derivative thus obtained was 63.4 g and the yield as HSiO$_{3/2}$ calculated from the starting triethoxysilane was 98.1%.

EXAMPLE 12

In a 1-liter, three-necked, separable flask made of glass were placed 84 g of methanol and 48 g of 0.001% by weight ammonia water and the liquid mixture was stirred by a mechanical stirrer at 300 rpm. The reactor was dipped in a water bath and the internal temperature thereof was controlled to 10°C. Separately, a liquid mixture of 320 g of methanol and 360 g of 0.01% by weight ammonia water was prepared as liquid A and a solution of 320 g of methanol and 200 g of trimethoxysilane was prepared as liquid B. The liquid A and the liquid B were dropped at a rate of 8 g/min and at a rate of 4 g/min, respectively, into the liquid mixture in the separable flask. Five minutes after the beginning of dropping, the reaction mixture began opalization. After completion of the dropping of the liquid A, the dropping of the liquid B was continued as it was. After completion of the dropping of the liquid B, the stirring of the reaction mixture was further continued for 3 hours to complete the reaction.

After completion of the reaction, the solvent was removed in the same manner as in Example 9 to obtain a white powder. This powder was observed through an electron microscope to find that the particles were in the form of a sphere having a substantially uniform diameter of 0.3 μm and only some of the particles were found to form secondary particles by agglomeration of several fine particles. The infrared absorption spectrum was consistent with FIG. 1 and in addition to absorption due to the Si—O—Si bond at 1100 cm$^{-1}$, an absorption due to the Si—H bond appeared largely at 2250 cm$^{-1}$, and no absorption of organic group appeared. Therefore, it was confirmed that a finely divided Si—H bond-containing silica derivative represented by the general formula H$_n$SiO$_{(4-n)/2}$ was produced. The results of measurement by a CHN-element analyzing apparatus were such that C=0%, H=1.9% and N=0%. Therefore, it was confirmed that the product was a finely divided Si—H bond-containing silica derivative represented by the formula HSiO$_{3/2}$. The weight of the finely divided Si—H bond-containing silica derivative thus obtained was 63.1 g and the yield as HSiO$_{3/2}$ calculated from the starting trimethoxysilane was 97.6%.

What is claimed is:

1. A process for producing a Si—H bond-containing solid product which is represented by the formula H$_n$SiO$_{(4-1)/2}$ wherein n is a positive number of 0.7 to 1.3, which process comprises subjecting to hydrolysis-condensation an alkoxysilane represented by the general formula H$_n$—Si(OR$^0$)$_{4-n}$ in which R$^0$ represents an alkyl group having 1 to 4 carbon atoms, plural R$^0$ groups may be the same as or different from one another and n is as defined above, using water in an amount of (4−n)/2 moles or more per mole of the alkoxysilane at a pH of 5.5 to 10.5.

2. The process according to claim 1, wherein the alkoxysilane consists of a trialkoxysilane represented by the general formula H—Si(OR)$_3$ in which R represents an alkyl group having 1 to 4 carbon atoms, and plural R groups may be the same as or different from one another.

3. The process according to claim 1, wherein the alkoxysilane consists of a mixture of (i) a trialkoxysilane represented by the general formula H—Si(OR)$_3$ in which R represents an alkyl group having 1 to 4 carbon atoms, and plural R groups may be the same as or different from one another, and (ii) a dialkoxysilane or tetraalkoxysilane represented by the general formula H$_m$—Si(OR')$_{4-m}$ in which R' represents an alkyl group having 1 to 4 carbon atoms, plural R' groups may be the same as or different from one another and m is 0 or 2, or a mixture thereof.

4. The process according to claim 1, wherein the hydrolysis-condensation is effected in a solvent in which the alkoxysilane and water can be dissolved.

5. The process according to claim 1, wherein water and the alkoxysilane are continuously or intermittently introduced into a reactor to gradually effect the hydrolysis-condensation of the alkoxysilane.

6. The process according to claim 1, wherein R$^0$ is methyl or ethyl.

7. The process according to claim 3, wherein R' in the general formula H$_m$—Si(OR')$_{4-m}$ is the same as R in the general formula H—Si(OR)$_3$.

8. The process according to claim 1, wherein the amount of water is (4−n)/2 moles to (4−n) moles.

9. The process according to claim 8, wherein the amount of water is (4−n)/2 moles to 0.65(4−n) moles.

* * * * *